United States Patent
Pilli

(10) Patent No.: US 12,305,300 B2
(45) Date of Patent: May 20, 2025

(54) CURRENT REVERSAL TOLERANT MULTILAYER MATERIAL, METHOD OF MAKING THE SAME, USE AS AN ELECTRODE, AND USE IN ELECTROCHEMICAL PROCESSES

(71) Applicant: Water Star, Inc., Parkman, OH (US)

(72) Inventor: Satyananda Kishore Pilli, Solon, OH (US)

(73) Assignee: Water Star, Inc., Parkman, OH (US)

(*) Notice: Subject to any disclaimer, the term of this patent is extended or adjusted under 35 U.S.C. 154(b) by 0 days.

(21) Appl. No.: 18/308,398

(22) Filed: Apr. 27, 2023

(65) Prior Publication Data
US 2023/0257893 A1    Aug. 17, 2023

Related U.S. Application Data

(63) Continuation of application No. 16/049,284, filed on Jul. 30, 2018, now Pat. No. 11,668,017.

(51) Int. Cl.
| | | |
|---|---|---|
| C25B 11/093 | (2021.01) | |
| C02F 1/78 | (2023.01) | |
| C25B 1/13 | (2006.01) | |

(52) U.S. Cl.
CPC .............. *C25B 11/093* (2021.01); *C02F 1/78* (2013.01); *C25B 1/13* (2013.01); *C02F 2303/22* (2013.01)

(58) Field of Classification Search
CPC .......... C25B 11/093; C02F 1/461–2001/46171
See application file for complete search history.

(56) References Cited

U.S. PATENT DOCUMENTS

| | | |
|---|---|---|
| 2,972,572 A | 2/1961 | Cope, Jr. et al. |
| 3,234,110 A | 2/1966 | Beer |

(Continued)

FOREIGN PATENT DOCUMENTS

| | | |
|---|---|---|
| CA | 1088026 A1 | 10/1980 |
| EP | 0090425 B1 | 10/1987 |

(Continued)

OTHER PUBLICATIONS

Awad et al., "Ozone electrogeneration at a high current efficiency using a tantalum oxide-platinum composite electrode," Electrochemistry Communications, vol. 8, 2006, pp. 1263-1269.

(Continued)

*Primary Examiner* — Alexander W Keeling
(74) *Attorney, Agent, or Firm* — Fredrikson & Byron, P.A.

(57) ABSTRACT

The invention provides an electrode comprising a substrate and a coating on the substrate. The coating comprises a plurality of layers, including the following layers in sequence moving outwardly from the substrate: a base layer comprising an oxide of a valve metal; a lower layer comprising an oxide of a platinum group metal and/or an oxide of a precious metal; and a mixed oxide primary layer comprising both: (i) an oxide of a platinum group metal and/or an oxide of a precious metal, and (ii) an oxide of a valve metal and/or an oxide of a group 15 metal. The base layer is devoid of any platinum group metal oxide, and the lower layer is devoid of any valve metal oxide. The present invention also provides methods of manufacturing such electrodes. Also provide are methods of using an electrochemical cell equipped with a certain multilayer coated electrode.

17 Claims, 9 Drawing Sheets

(56) References Cited

U.S. PATENT DOCUMENTS

| | | |
|---|---|---|
| 3,265,526 A | 8/1966 | Beer |
| 3,267,010 A | 8/1966 | Creutz et al. |
| 3,293,167 A | 12/1966 | Lawrence |
| 3,616,445 A | 10/1971 | De Nora et al. |
| 3,632,498 A | 1/1972 | Beer |
| 3,657,102 A | 4/1972 | Keith et al. |
| 3,711,385 A | 1/1973 | Beer |
| 3,711,397 A | 1/1973 | Martinsons |
| 3,718,550 A | 2/1973 | Klein |
| 3,751,296 A | 8/1973 | Beer |
| 3,773,554 A | 11/1973 | Lee et al. |
| 3,778,307 A | 12/1973 | Beer |
| 3,788,968 A | 1/1974 | Mueller et al. |
| 3,840,443 A | 10/1974 | Beer |
| 3,869,312 A | 3/1975 | Moss et al. |
| 3,875,043 A | 4/1975 | Franks |
| 3,878,083 A | 4/1975 | De Nora |
| 3,882,002 A | 5/1975 | Cook |
| 3,926,751 A | 12/1975 | De Nora |
| 3,933,616 A | 1/1976 | Beer |
| 3,940,323 A | 2/1976 | Cook |
| 3,948,751 A | 4/1976 | Bianchi et al. |
| 3,950,240 A | 4/1976 | Cookfair et al. |
| 4,005,003 A | 1/1977 | Popplewell et al. |
| 4,039,400 A | 8/1977 | Hayfield |
| 4,086,157 A | 4/1978 | Koziol et al. |
| 4,272,354 A | 6/1981 | de Nora et al. |
| 4,310,391 A | 1/1982 | Okinaka et al. |
| 4,318,795 A | 3/1982 | Bianchi et al. |
| 4,411,761 A | 10/1983 | Roos et al. |
| 4,426,262 A | 1/1984 | Langley et al. |
| 4,437,948 A | 3/1984 | Okinaka et al. |
| 4,469,564 A | 9/1984 | Okinaka et al. |
| 4,517,068 A | 5/1985 | Hinden et al. |
| 4,528,084 A | 7/1985 | Beer et al. |
| 4,530,742 A | 7/1985 | Carlin et al. |
| 4,585,540 A | 4/1986 | Beer et al. |
| 4,589,969 A | 5/1986 | Yurkov et al. |
| 5,006,321 A | 4/1991 | Dorfman et al. |
| 5,098,546 A | 3/1992 | Kawashima et al. |
| 5,156,726 A | 10/1992 | Nakada et al. |
| 5,167,788 A | 12/1992 | Hardee et al. |
| 5,262,040 A | 11/1993 | Hardee et al. |
| 5,294,317 A | 3/1994 | Saito et al. |
| 5,324,407 A | 6/1994 | Ernes et al. |
| 5,334,293 A | 8/1994 | Cairns et al. |
| 5,407,556 A | 4/1995 | Shimada et al. |
| 5,489,368 A | 2/1996 | Suitsu et al. |
| 5,531,875 A | 7/1996 | Shimamune et al. |
| 5,783,050 A | 7/1998 | Coin et al. |
| 5,908,540 A | 6/1999 | Fanti |
| 6,071,570 A | 6/2000 | Hardee et al. |
| 6,103,093 A | 8/2000 | Nidola et al. |
| 6,217,729 B1 | 4/2001 | Zolotarsky et al. |
| 6,231,731 B1 | 5/2001 | Kondo et al. |
| 6,251,254 B1 | 6/2001 | Katoh et al. |
| 6,352,625 B1 | 3/2002 | Andolfatto et al. |
| 6,527,924 B1 | 3/2003 | Andolfatto et al. |
| 6,527,939 B1 | 3/2003 | Hardee |
| 6,572,758 B2 | 6/2003 | Zolotarsky et al. |
| 6,802,948 B2 | 10/2004 | Hardee et al. |
| 7,156,962 B2 | 1/2007 | Koizumi et al. |
| 7,247,229 B2 | 7/2007 | Hardee |
| 7,258,778 B2 | 8/2007 | Hardee |
| 7,378,005 B2 | 5/2008 | Kaneda et al. |
| 7,494,583 B2 | 2/2009 | Weres |
| 7,566,389 B2 | 7/2009 | Shimamune et al. |
| 7,632,535 B2 | 12/2009 | Carlson et al. |
| 7,811,426 B2 | 10/2010 | Hashimoto et al. |
| 7,815,781 B2 | 10/2010 | Mojana et al. |
| 7,884,044 B2 | 2/2011 | DiFranco et al. |
| 7,976,989 B2 | 7/2011 | Lopez et al. |
| 7,985,327 B2 | 7/2011 | Christensen et al. |
| 8,002,955 B2 | 8/2011 | Daly et al. |
| 8,070,924 B2 | 12/2011 | Ohsaka et al. |
| 8,075,751 B2 | 12/2011 | Xie et al. |
| 9,090,981 B2 | 7/2015 | Brichese et al. |
| 9,222,181 B2 | 12/2015 | Benedetto |
| 9,353,448 B2 | 5/2016 | Okazaki et al. |
| 2002/0139689 A1 | 10/2002 | Zolotarsky et al. |
| 2004/0031692 A1 | 2/2004 | Hardee |
| 2005/0211553 A1 | 9/2005 | Mojana et al. |
| 2007/0000774 A1 | 1/2007 | Weres |
| 2007/0034505 A1* | 2/2007 | Ikematsu .................. C25B 1/13 |
| | | 427/372.2 |
| 2008/0023341 A1* | 1/2008 | Rossi ........................ C25B 1/02 |
| | | 205/759 |
| 2009/0288958 A1 | 11/2009 | Sandoval et al. |
| 2010/0044219 A1 | 2/2010 | Carlson et al. |
| 2010/0096260 A1 | 4/2010 | Xie et al. |
| 2010/0187122 A1 | 7/2010 | Zolotarsky et al. |
| 2011/0226634 A1 | 9/2011 | Bhavaraju |
| 2011/0290642 A1 | 12/2011 | Hayashida |
| 2012/0085571 A1* | 4/2012 | Niksa ..................... C25B 11/093 |
| | | 174/258 |
| 2012/0091007 A1 | 4/2012 | Imoto et al. |
| 2012/0125785 A1 | 5/2012 | Gulla et al. |
| 2013/0087450 A1 | 4/2013 | Antozzi et al. |
| 2013/0175165 A1 | 7/2013 | Okazaki et al. |
| 2014/0353168 A1 | 12/2014 | Benedetto |
| 2015/0041410 A1 | 2/2015 | Niksa et al. |
| 2015/0096896 A1 | 4/2015 | Gull et al. |
| 2015/0136591 A1 | 5/2015 | Fraim et al. |
| 2015/0144499 A1 | 5/2015 | Benedetto |
| 2015/0292106 A1* | 10/2015 | Calderara ................. C25C 7/02 |
| | | 427/126.1 |
| 2015/0308004 A1 | 10/2015 | Brichese et al. |
| 2016/0002076 A1 | 1/2016 | Jha et al. |
| 2016/0251763 A1 | 9/2016 | Benedetto |
| 2017/0267552 A1 | 9/2017 | Moon et al. |
| 2020/0148559 A1 | 5/2020 | Krasovic |

FOREIGN PATENT DOCUMENTS

| | | |
|---|---|---|
| EP | 495468 A2 | 7/1992 |
| EP | 538955 A1 | 4/1993 |
| EP | 598517 A1 | 5/1994 |
| EP | 867527 B1 | 3/2001 |
| GB | 1147442 A | 4/1969 |
| GB | 1195871 A | 6/1970 |
| GB | 1344540 A | 1/1974 |
| GB | 2007712 A | 5/1979 |
| JP | H0499294 A | 3/1992 |
| JP | H09125291 A | 5/1997 |

OTHER PUBLICATIONS

Awad et al., "Ozone electrogeneration on Pt-TaOy sol-gel film modified titanium electrode: Effect of electrode composition on the electrocatalytic activity," Journal of Energy Chemistry, vol. 24, No. 2, 2015, pp. 178-184.

Kaneda et al., "A Novel Electrode for Ozone Generation," Chemistry Letters, vol. 34, No. 10, 2005, pp. 1320-1321.

Kaneda et al., "Ozone Generation by a TaOx and Pt Composite Insulator-Coated Ti Electrode," Electrochemical and Solid-State Letters, vol. 8, No. 6, 2005, pp. J13-J16.

Kaneda et al., "Si/TiOx/Pt/TaOx Electrodes Fabricated by Sputtering for Electrochemical Ozone Generation," Japanese Journal of Applied Physics, vol. 45, No. 8A, 2006, pp. 6417-6419.

Kaneda et al., "Ti/Pt/(Pt-TaOx) Electrode Fabricated by Thermal Decomposition and Si/Pt/TaOx Electrode Fabricated by Sputtering for Ozone Generation," Japanese Journal of Applied Physics, vol. 45, No. 6A, 2006, pp. 5154-5162.

Trasatti, "Physical electrochemistry of ceramic oxides," Electrochimica Acta, vol. 36, No. 2, 1991, pp. 225-241.

Marselli et al., "Electrogeneration of Hydroxyl Radicals on Boron-Doped Diamond Electrodes," Journal of the Electrochemical Society, vol. 150, No. 3, 2003, pp. D79-D83.

Niksa et al., "Multi-Layer Mixed Metal Oxide Electrode and Method for Making Same," U.S. Appl. No. 13/117,373, filed May 27, 2011, issued as U.S. Pat. No. 8,580,091 on Nov. 12, 2013, 32 pages.

(56) References Cited

OTHER PUBLICATIONS

U.S. Appl. No. 13/117,373, Notice of Allowance mailed Sep. 25, 2013, 8 pages.
U.S. Appl. No. 13/117,373, Response to Non-Final Office Action filed Jan. 25, 2013, 15 pages.
U.S. Appl. No. 13/117,373, Non-Final Office Action mailed Nov. 13, 2012, 9 pages.
International Patent Application No. PCT/US00/17403, International Search Report dated Nov. 15, 2000, 4 pages.

* cited by examiner

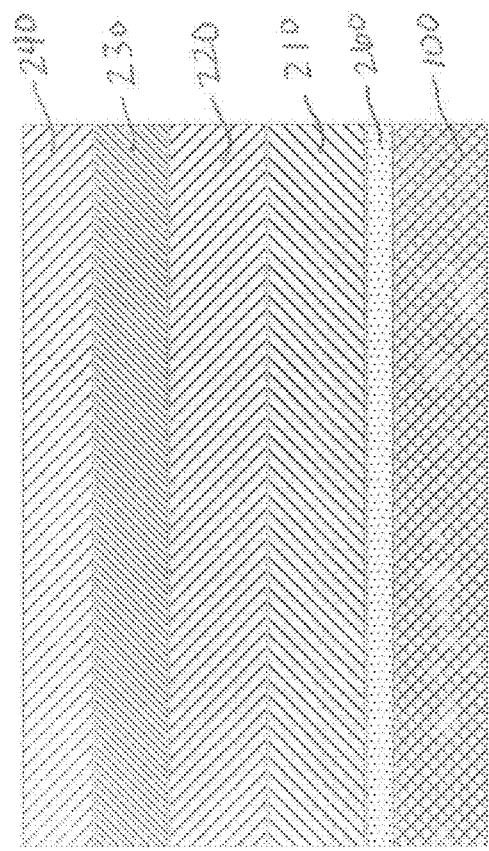
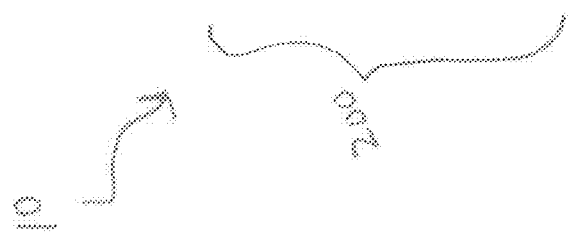
Fig. 4

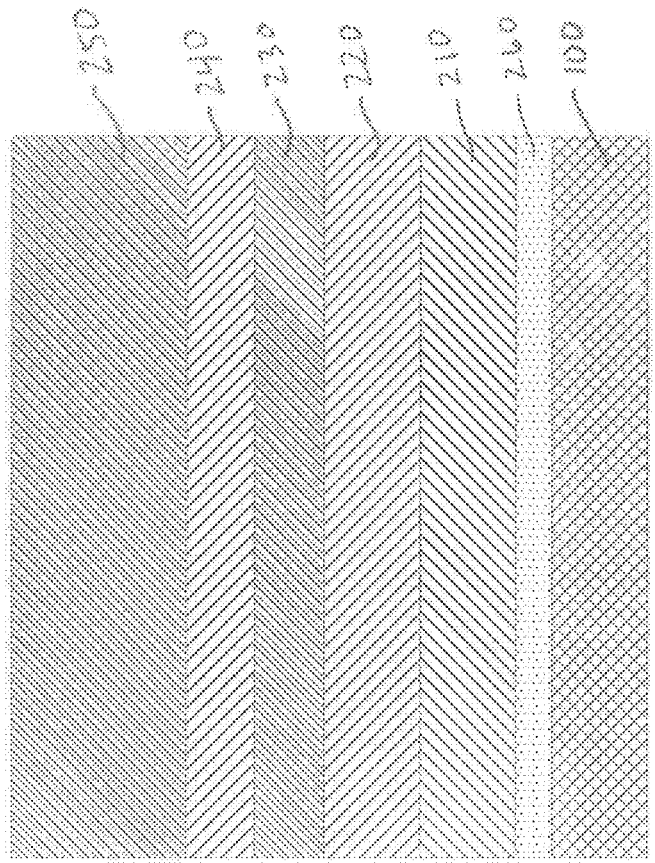
Fig. 6
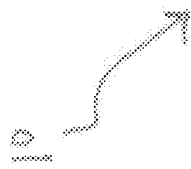

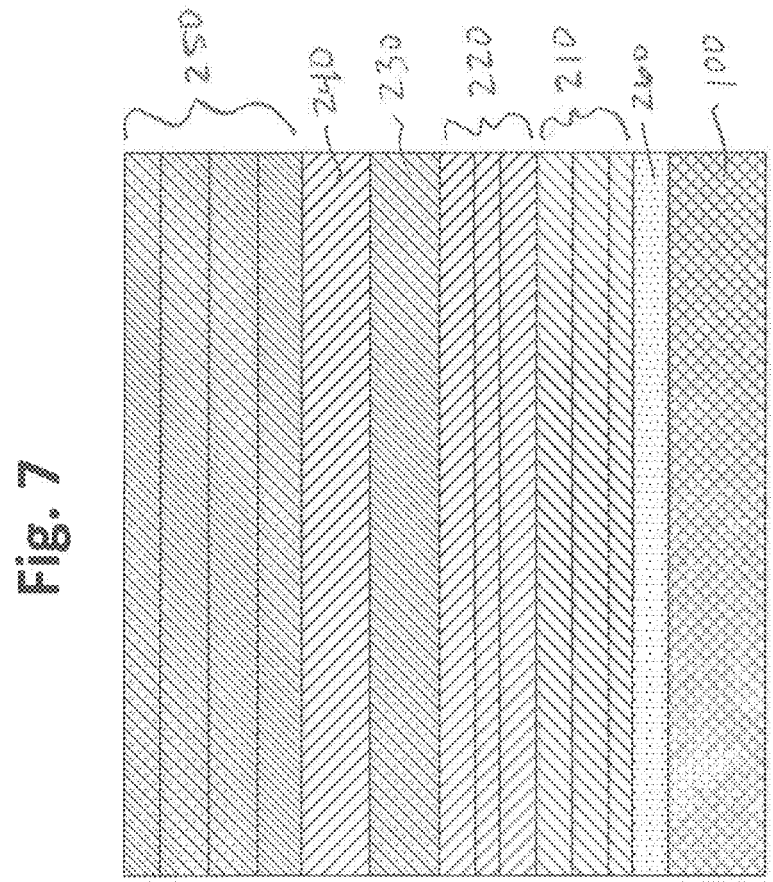

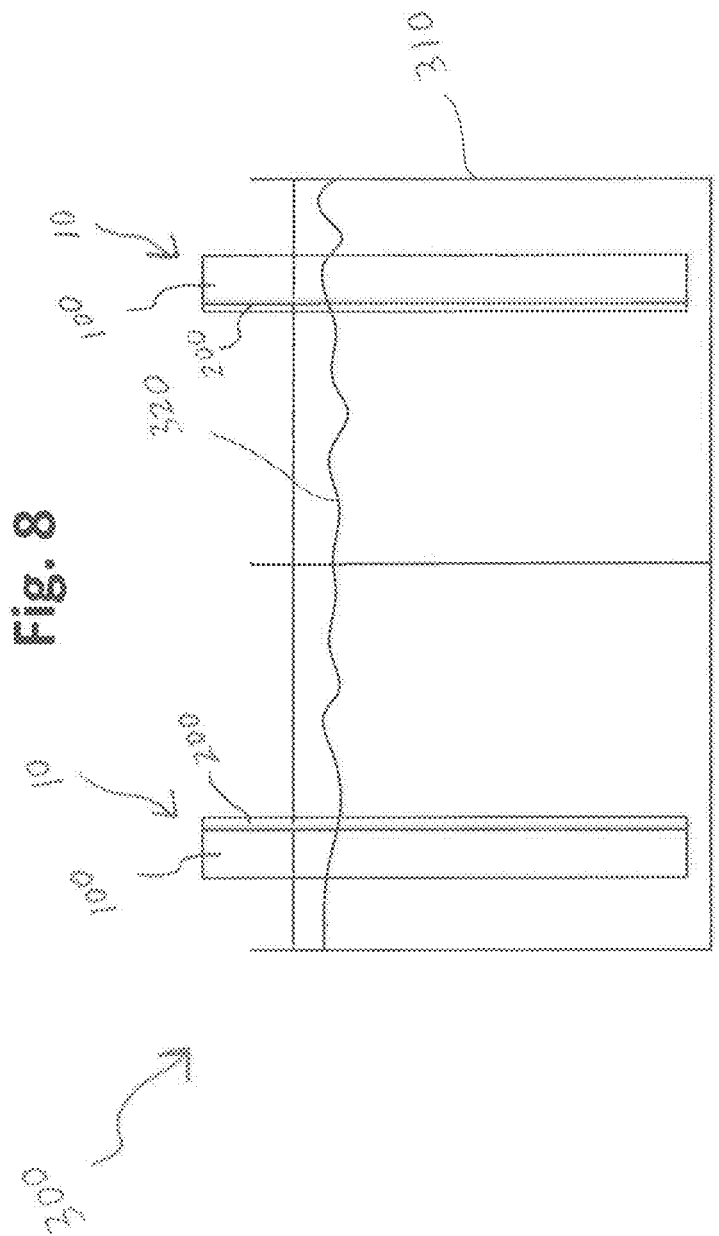

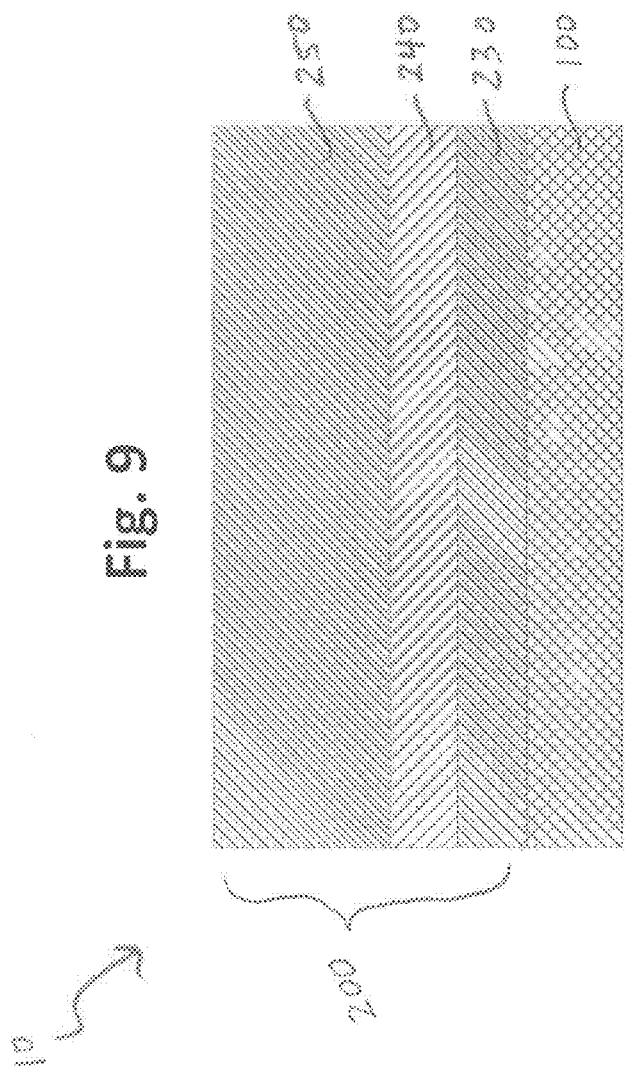

CURRENT REVERSAL TOLERANT MULTILAYER MATERIAL, METHOD OF MAKING THE SAME, USE AS AN ELECTRODE, AND USE IN ELECTROCHEMICAL PROCESSES

RELATED MATTERS

This application is a continuation of U.S. patent application Ser. No. 16/049,284, filed Jul. 30, 2018, the contents of which are incorporated herein by reference in their entirety.

FIELD OF THE INVENTION

The present invention relates generally to electrodes. More particularly, this invention relates to an electrode that is tolerant to current reversal. The present invention also provides methods of manufacturing such an electrode, methods of using such an electrode in various electrochemical processes, and an electrochemical cell equipped with such an electrode.

BACKGROUND OF THE INVENTION

Various electrodes are known for use in electrochemical cells. Some electrodes have a multilayer composition. For example, various coated electrodes having one or more mixed metal oxide layers are known. Multilayer electrodes have been used in different electrochemical applications, and further development of new electrode coatings could open the door to using such electrodes in even more applications.

As just one example, there has been interest in developing anodes that are less catalytic toward the oxygen evolution reaction. This allows operation at high anodic potentials in aqueous electrolytes for producing strong oxidants, such as ozone. In addition, advanced oxidation techniques can be used for destructing organic contaminants in industrial wastewater. Direct electro-oxidation using high overpotential electrodes is one approach, and antimony-doped tin oxide or BDD (i.e., boron-doped diamond) electrodes are candidates for this application. However, the stability of tin oxide is limited, and large-scale manufacture of diamond-coated titanium has proven difficult and costly.

As set forth in the present disclosure, it would be desirable to provide a coated electrode that is tolerant to current reversal. Additionally or alternatively, it would be desirable to provide a coated electrode that can be used in a cell containing hard cations. In some cases, it would be desirable to provide a coated electrode that can generate ozone. It would also be desirable to provide a coated electrode that is tolerant to current reversal, but is less expensive and more flexible in form than BDD anodes. Further, it would be desirable to provide an electrode of this nature that can be manufactured at relatively low temperatures.

SUMMARY OF THE INVENTION

Certain embodiments of the present invention provide an electrode comprising a substrate and a coating on the substrate. The coating comprises a plurality of layers. The plurality of layers comprises the following in sequence moving outwardly from the substrate: a base layer; a lower layer; and a mixed oxide primary layer. The base layer comprises an oxide of a valve metal and preferably is devoid of any platinum group metal oxide. The lower layer comprises an oxide of a platinum group metal and/or an oxide of a precious metal and preferably is devoid of any valve metal oxide. The mixed oxide primary layer comprises both: (i) an oxide of a platinum group metal and/or an oxide of a precious metal, and (ii) an oxide of a valve metal and/or an oxide of a group 15 metal.

In some embodiments, the invention provides a method of manufacturing an electrode. The method involves depositing a coating comprising a plurality of layers on a substrate. Depositing the coating comprises depositing, on the substrate, a base layer comprising an oxide of a valve metal. The base layer preferably is devoid of any platinum group metal oxide. Depositing the base layer involves applying one or more coats of a base solution on the substrate, and drying and thermally treating each coat of the base solution in an atmosphere containing oxygen. The base solution comprises a salt of a valve metal. Depositing the coating further comprises depositing, on the base layer, a lower layers comprising an oxide of a platinum group metal and/or an oxide of a precious metal. The lower layer preferably is devoid of any valve metal oxide. Depositing the lower layer involves applying one or more coats of a lower solution on the substrate, and drying and thermally treating each coat of the lower solution in an atmosphere containing oxygen. The lower solution comprises a salt of a platinum group metal and/or a salt of a precious metal. Depositing the coating further comprises depositing, on the lower layer, a mixed oxide primary layer. Depositing the mixed oxide primary layer involves applying one or more coats of a primary solution on the substrate, and drying and thermally treating each coat of the primary solution in an atmosphere containing oxygen. The primary solution comprises both (i) a salt of a platinum group metal and/or a salt of a precious metal, and (ii) a salt of a valve metal and/or a salt of a group 15 metal.

Some embodiments of the invention provide a method of using an electrochemical cell to perform an electrochemical process. The electrochemical cell comprises an electrode immersed in an electrolyte. The electrode comprises a substrate and a coating on the substrate. The method comprises operating the electrochemical cell so as to reverse a polarity of electrical current flow through the electrode. The coating comprises a plurality of layers. The plurality of layers comprises the following in sequence moving outwardly from the substrate: a mixed oxide primary layer; an intermediate layer; and a mixed oxide upper layer. The mixed oxide primary layer comprises both: (i) an oxide of a platinum group metal and/or an oxide of a precious metal, and (ii) an oxide of a valve metal and/or an oxide of a group 15 metal. The intermediate layer comprises an oxide of a platinum group metal and/or an oxide of a precious metal. The intermediate layer preferably is devoid of any valve metal oxide. The mixed oxide upper layer comprises both: (i) an oxide of a platinum group metal and/or an oxide of a precious metal, and (ii) an oxide of a valve metal and/or an oxide of a group 15 metal.

In certain embodiments, the invention provides an electrode comprising a substrate and a coating on the substrate. The coating comprises a plurality of layers. The plurality of layers comprises the following in sequence moving outwardly from the substrate: a base layer; a lower layer; a mixed oxide primary layer; an intermediate layer; and a mixed oxide upper layer. The base layer comprises an oxide of a valve metal. The base layer preferably is devoid of any platinum group metal oxide. The lower layer comprises an oxide of a platinum group metal and/or an oxide of a precious metal. The lower layer preferably is devoid of any valve metal oxide. The mixed oxide primary layer comprises both: (i) an oxide of a platinum group metal and/or an oxide of a precious metal, and (ii) an oxide of a valve metal and/or an oxide of a group 15 metal. The intermediate layer comprises an oxide of a platinum group metal and/or an oxide of a precious metal. The intermediate layer preferably is devoid of any valve metal oxide. The mixed oxide upper layer comprises both: (i) an oxide of a platinum group metal and/or an oxide of a precious metal, and (ii) an oxide of a valve metal and/or an oxide of a group 15 metal.

BRIEF DESCRIPTION OF THE DRAWINGS

FIG. 4 is a schematic cross-sectional view of an electrode in accordance with still other embodiments of the present disclosure.

FIG. 6 is a schematic cross-sectional view of an electrode in accordance with certain other embodiments of the present disclosure.

FIG. 7 is a schematic cross-sectional view of an electrode in accordance with certain embodiments of the present disclosure.

FIG. 8 is a schematic side view of an electrochemical cell in accordance with certain embodiments of the present disclosure.

FIG. 9 is a schematic cross-section view of an electrode in accordance with certain other embodiments of the present disclosure.

DETAILED DESCRIPTION OF THE INVENTION

Figure 1:
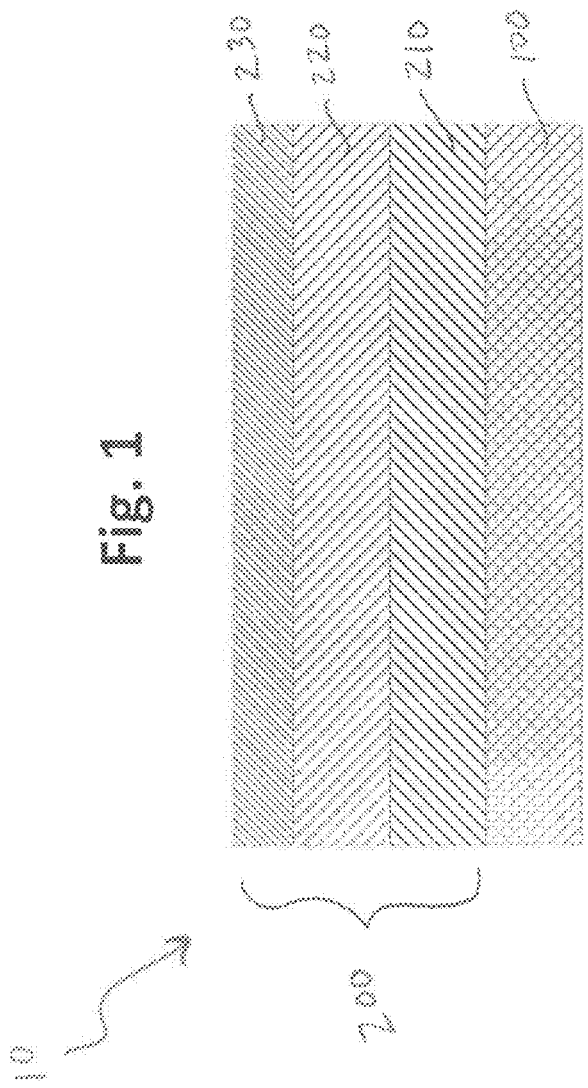
FIG. 1 is a schematic cross-sectional view of an electrode in accordance with certain embodiments of the present disclosure.
Figure 2:
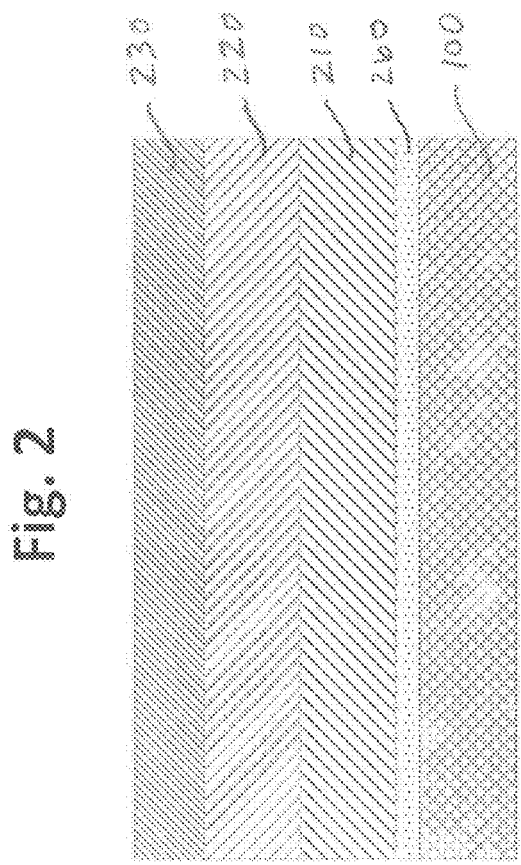
FIG. 2 is a schematic cross-sectional view of an electrode in accordance with other embodiments of the present disclosure.

The following detailed description is to be read with reference to the drawings, in which like elements in different drawings have like reference numerals, which are not necessarily to scale, depict selected embodiments and are not intended to limit the scope of the invention. Skilled artisans will recognize that the examples provided herein have many useful alternatives that fall within the scope of the invention.

Referring to the drawings, and in particular, FIG. 1, there is shown one embodiment of an electrode generally represented by reference numeral 10. The electrode 10 can be used in a variety of electrochemical applications. The electrode 10 is tolerant to current reversal. It can therefore be used in an electrochemical cell that contains hard water (e.g., hard cations). In such cases, the electrode 10 helps mitigate the buildup of scale. In certain non-limiting embodiments, the electrode 10 can be used (e.g., is configured) to generate ozone when immersed in an electrochemical cell containing an aqueous electrolyte comprising hard water.

The electrode 10 of the present invention comprises a substrate 100 having a coating 200 deposited thereon. The substrate 100 comprises a valve metal, and can optionally be formed of an alloy or other combination of two or more valve metals. As defined herein, the term "valve metal" refers to titanium, tantalum, hafnium, tungsten, aluminum, vanadium, zirconium, niobium, or any combination thereof. Titanium is often a preferred choice for the substrate 100, based upon its cost, availability, workability and known corrosion resistance in aggressive, aqueous environments.

The substrate 100 can be provided in any of a variety of forms, such as a plate, a perforated plate, a mesh, a tubular or cylindrical structure, or a rod-like structure. In many cases, the substrate 100 will be a titanium plate or a titanium mesh. In certain embodiments, the substrate will be a carbon cloth.

The coating 200 comprises a plurality of layers (i.e., it is a multi-layer coating). Preferably, the coating 200 is formed by at least three layers. In some embodiments, the coating 200 comprises five layers. It is to be understood, however, that the total number of layers and sublayers can vary depending upon the intended application. Thus, the number of layers and sublayers of the coating 200 noted in the examples herein is by no means limiting to the scope of the invention.

In the embodiment of FIG. 1, the electrode 10 comprises, in sequence, the substrate 100, a base layer 210, a lower layer 220, and a mixed oxide primary layer 230. In FIG. 1, the base layer 210 is in contact with the substrate 100, the lower layer 220 is in contact with the base layer 210, and the mixed oxide primary layer 230 is in contact with the lower layer 220. This, however, is not required.

The base layer 210 comprises an oxide of a valve metal. The valve metal of the base layer 210 can be any valve metal, and this layer can optionally comprise a combination of two or more valve metals. The base layer 210 (i.e., the, or each, sublayer thereof) preferably is devoid of any platinum group metal oxide, and preferably functions as a passive protective layer of the coating. By passive, we mean the layer is a non-catalytic layer of the coating. Thus, the base layer 210 preferably is a corrosion resistant valve metal oxide layer.

In cases where the base layer 210 comprises more than one sublayer, each sublayer can have the same composition, or a different composition, as any other sublayer of the base layer. For example, the base layer 210 can optionally comprise a plurality of sublayers that all have the same, or substantially the same, composition. In such cases, all the sublayers of the base layer may have the same composition.

In certain examples, the base layer 210 comprises at least two sublayers, or even more than two sublayers, while optionally having less than seven sublayers. For example, it may consist of 4-6 sublayers.

In certain non-limiting examples, the base layer 210 (i.e., the, or each, sublayer thereof) consists or consists essentially of tantalum oxide, titanium oxide, niobium oxide, or zirconium oxide. In one example, the base layer consists or consists essentially of $Ta_2O_{5-x}$. This, however, is by no means limiting.

With continued reference to the embodiment of FIG. 1, the lower layer 220 is located further from the substrate 100 than is the base layer 210. The lower layer 220 comprises an oxide of a platinum group metal and/or an oxide of a precious metal. As defined herein, the precious metals are gold and silver, whereas the platinum group metals are platinum, ruthenium, rhodium, palladium, osmium, and iridium. Thus, where the lower layer 220 comprises a precious metal oxide, the layer includes gold, silver, or any combination thereof. Where the lower layer 220 comprises a platinum group metal oxide, the layer includes platinum, ruthenium, rhodium, palladium, osmium, iridium, or any combination thereof. The lower layer 220 (i.e., the, or each, sublayer thereof) preferably is devoid of any valve metal oxide.

In cases where the lower layer 220 comprises more than one sublayer, each sublayer can have the same composition as, or a different composition from, any other sublayer of the lower layer. For example, the lower layer 220 can optionally comprise a plurality of sublayers that all have the same, or substantially the same, composition. In such cases, all the sublayers of the base layer may have the same composition.

In certain examples, the lower layer 220 comprises at least two sublayers, or even more than two sublayers, while optionally having less than six sublayers. For example, it may consist of five sublayers.

In certain non-limiting examples, the lower layer 220 (i.e., the, or each, sublayer thereof) consists, or consists essentially of, platinum oxide, such as $PtO_2$. However, this is not required.

In some cases, there is no mixed metal oxide layer between the base layer and the lower layer. Additionally or alternatively, the coating 200 can optionally be devoid of any layer comprising both an oxide of a valve metal and an oxide of a platinum group metal that is located between the base layer and the lower layer. In some embodiments of this nature, the lower layer is in contact with the base layer.

The mixed oxide primary layer 230 comprises both: (i) an oxide of a platinum group metal and/or an oxide of a precious metal, and (ii) an oxide of a valve metal and/or an oxide of a group 15 metal. Where the mixed oxide primary layer 230 comprises an oxide of a platinum group metal, any one or more of the platinum group metals can be used. Where the mixed oxide primary layer 230 comprises a precious metal, gold, silver, or a combination thereof can be used. Where the mixed oxide primary layer 230 comprises an oxide of a valve metal, any one or more valve metals can be used. Where the mixed oxide primary layer 230 comprises an oxide of a group 15 metal, the group 15 metal is bismuth or antimony. When provided, the oxide of the group 15 metal preferably is bismuth oxide. If desired, the mixed oxide primary layer 230 can include both bismuth and antimony.

In certain embodiments, the mixed oxide primary layer 230 (i.e., the, or each, sublayer thereof) comprises both platinum and tantalum. This, however, is by no means required.

In cases where the mixed oxide primary layer 230 includes more than one sublayer, each such sublayer can have the same composition as, or a different composition from, any other sublayer of the mixed oxide primary layer 230. For example, the mixed oxide primary layers 220 can optionally comprise a plurality of sublayers that all have the same, or substantially the same, composition. In such cases, all the sublayers of the mixed oxide primary layer may have the same composition.

In certain examples, the mixed oxide primary layer 230 consists of a single sublayer.

In some cases, the coating 200 comprises more than three layers, such as at least four layers. Furthermore, each layer of the coating can be formed by one or more sublayers, as described above with reference to the base layer, lower layer, and mixed oxide primary layer, which are present in certain embodiments of the coating 200.

Figure 3:
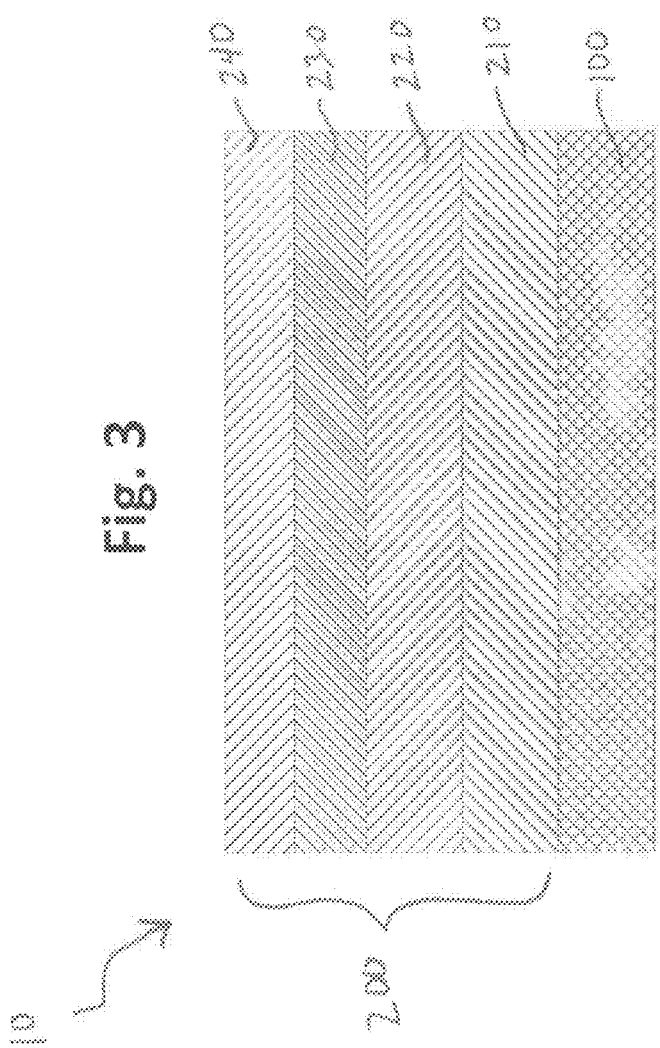
FIG. 3 is a schematic cross-sectional view of an electrode in accordance with certain other embodiments of the present disclosure.

In some embodiments, the plurality of layers further comprises an intermediate layer 240. In the embodiment of FIG. 3, the intermediate layer 240 is located further from the substrate 100 than is the mixed oxide primary layer 230. The intermediate layer 240 comprises an oxide of a platinum group metal and/or an oxide of a precious metal. Where the intermediate layer 240 comprises an oxide of a platinum group metal, any one or more of the platinum group metals can be used. Where the intermediate layer 240 comprises an oxide of a precious metal, gold, silver, or a combination thereof can be used. Preferably, the intermediate layer 240 (i.e., the, or each, sublayer thereof) is devoid of any valve metal oxide. The intermediate layer 240 can have the same composition as, or a different composition from, the lower layer 220.

In cases where the intermediate layer 240 comprises more than one sublayer, each such sublayer can have the same composition as, or a different composition from, any other sublayer of the intermediate layer. For example, the intermediate layer 240 can optionally comprise a plurality of sublayers that all have the same, or substantially the same, composition. In such cases, all the sublayers of the intermediate layer may have the same composition.

In certain examples, the intermediate layer 240 comprises (e.g., consists of) 1-5 sublayers. In some cases, it comprises at least two sublayers, or even more than two sublayers, while optionally having less than six sublayers.

In certain non-limiting examples, the intermediate layer 240 (i.e., the, or each, sublayer thereof) consists, or consists essentially of, a mixed oxide of platinum and tantalum, such a $PtO_2+Ta_2O_{5-x}$. This, however, is not limiting.

In some cases, the plurality of layers of the coating 200 comprises five layers, including the base layer 210, the lower layer 220, the mixed oxide primary layer 230, and the intermediate layer 240. In such cases, at least three layers of the coating preferably have different compositions from one another. In some cases, the coating includes five layers that are each contiguous to one or two layers of different composition.

Figure 5:
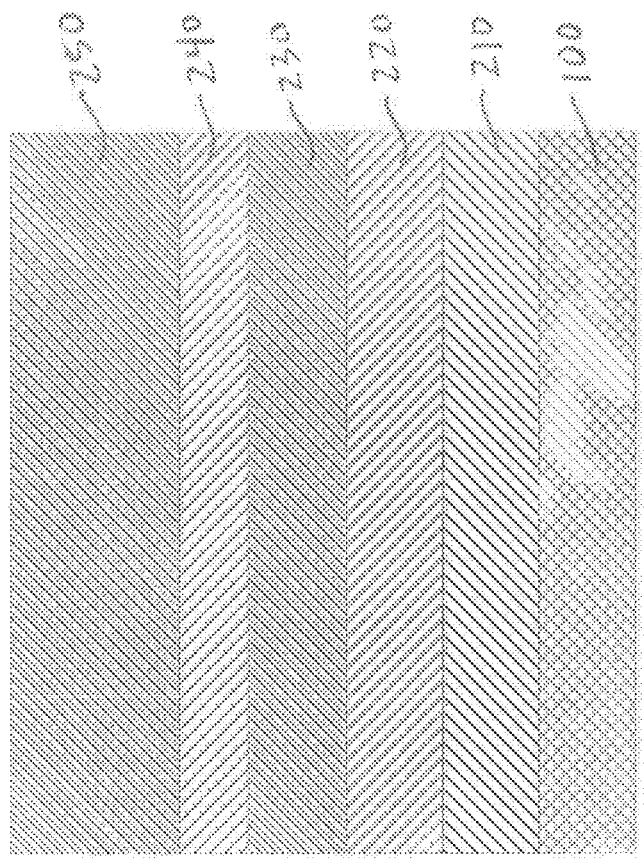
FIG. 5 is a schematic diagram of an electrode in accordance with certain embodiments of the present disclosure.

Referring now to FIG. 5, an electrode 10 comprising five layers is shown. Here, in addition to the four layers described above, the coating 200 includes a mixed oxide upper layer 250. The mixed oxide upper layer 250 is located further from the substrate 100 than is the intermediate layer 240. In some embodiments of this nature, the coating 200 has an outermost (e.g., exposed) face that is defined by the mixed oxide upper layer 250.

When provided, the mixed oxide upper layer 250 comprises both: (i) an oxide of a platinum group metal and/or an oxide of a precious metal, and (ii) an oxide of a valve metal and/or an oxide of a group 15 metal. Where the mixed oxide upper layer 250 comprises an oxide of a platinum group metal, any one or more of the platinum group metals can be used. Where the mixed oxide upper layer 250 comprises an oxide of a precious metal, gold, silver, or a combination thereof can be used. Where the mixed oxide upper layer 250 comprises an oxide of a valve metal, any one or more valve metals can be used. Where the mixed oxide upper layer 250 comprises an oxide of a group 15 metal, bismuth, antimony, or a combination thereof can be used. When provided, the oxide of the group 15 metal preferably is bismuth oxide. If desired, both bismuth and antimony can be used. When the coating 200 includes one or more of the optional group 15 metal oxides in the mixed oxide upper layer 250, the overvoltage of the electrode 100 can be increased, while also potentially improving the durability of the electrode 100.

The mixed oxide upper layer 250 can have the same composition as, or a different composition from, the mixed oxide primary layer 230. In some non-limiting examples, all the sublayers of both the mixed oxide upper layer 250 and the mixed oxide primary layer 230 have the same, or substantially the same, composition.

In cases where the mixed oxide upper layer 250 comprises more than one sublayer, each such sublayer can have the same composition as, or a different composition from, any other sublayer of the mixed oxide upper layer. For example, the mixed oxide upper layer 250 can optionally comprise a plurality of sublayers that all have the same, or substantially the same, composition. In such cases, all the sublayers of the mixed oxide upper layer 250 may have the same, composition.

In certain examples, the mixed oxide upper layer 250 comprises at least two sublayers, or even more than ten sublayers, while optionally having less than 100 sublayers or less than 50 sublayers. For example, it may consist of 15-35 sublayers.

In certain embodiments, the mixed oxide upper layer 250 (i.e., the, or each, sublayer thereof) consists, or consists essentially of, a mixed oxide of platinum and tantalum, such as $PtO_2+Ta_2O_{5-x}$. This, however, is by no means required.

In certain non-limiting embodiments where the coating 200 has at least five layers, the coating 200 comprises the following layers: a base layer 210 comprising an oxide of tantalum; a lower layer 220 comprising an oxide of platinum; a mixed oxide primary layer 230 comprising both platinum and tantalum; an intermediate layer 240 comprising an oxide of platinum; and a mixed oxide upper layer 250 comprising both platinum and tantalum.

In certain embodiments, the plurality of layers includes a barrier layer 260 in contact with (i.e., touching) the substrate 100. In the non-limiting examples of FIGS. 2, 4, 6, and 7, for example, a barrier layer 260 is located beneath the base layer 210. When provided, the barrier layer 260 can have various compositions. Preferably, it comprises an oxide of one or more valve metals, and is devoid of any platinum group metal or precious metal. For example, it can comprise (or consist of, or consist essentially of) one or more valve metal oxides. In some cases, the barrier layer is formed of an oxide of tantalum. The barrier layer 260 can optionally be provided in any embodiment of the present disclosure.

FIG. 6 shows a preferred configuration of the coating 200 having all the layers mentioned above. In particular, FIG. 6 provides, in sequence: the substrate 100; the barrier layer 260; the base layer 210; the lower layer 220; the mixed oxide primary layer 230; the intermediate layer 240; and the mixed oxide upper layer 250.

Without intending to be bound by any particular theory, it is surmised that the arrangement and compositions of the lower layer and the mixed oxide primary layer, and/or the mixed oxide primary layer and the intermediate layer, or all three of these layers, contribute to the durability characteristics of the electrode 10 under current reversal or non-current reversal conditions. In some cases, the lower layer 220 may be susceptible to eroding at high overvoltage operating conditions if not sufficiently protected. In those cases, the mixed oxide primary layer 230 and/or the intermediate layer 240 protect the lower layer 220 against such erosion. It is believed that the unusual structural arrangements disclosed herein (e.g., enclosing the mixed oxide primary layer 230 between a lower layer 220 and an intermediate layer 240 of the nature described) contribute to the resistance required for the coating 200 to function in current reversal processes. These structural arrangements may also increase the standard electrode potential ("SEP") or overvoltage of the electrode 10.

As noted above, each layer of the coating 200 is formed by one or more sublayers. Although certain layers are shown in the figures as being a single sublayer, the total number of sublayers in the different layers can be varied to suit a variety of applications. This makes it possible to fine-tune the overall conductivity and overpotential of the electrode 10, as desired for a given electrochemical application. For example, an electrode 10 that is tolerant to current reversal can be manufactured to operate at high anodic potentials in aqueous electrolytes to generate strong oxidants (e.g., ozone, peracetic acid, or persulfuric acid), or generate chlorate (oxidize Cr(III) to Cr(VI)).

FIG. 7 shows a non-limiting example of the coating 200 wherein the base layer 210, the lower layer 220, and the mixed oxide upper layer 250 are each formed by multiple sublayers. Specifically, FIG. 7 shows the mixed oxide upper layer 250 as formed by four sublayers, while each of the base layer 210 and the lower layer 220 is formed by three sublayers. It is to be understood that this example is by no means limiting.

Based on both its structure and composition, the electrode 10 offers the ability to fine-tune oxygen overvoltage and oxidizing ability at low current densities such that the electrode is tolerant to current reversal. For example, the present electrode composition maintains, or at least substantially maintains, its high overpotential under current reversal for long periods of time. In contrast, with coated electrodes that are not tolerant to current reversal, the overpotential of the electrode deteriorates rapidly within a few cycles of current reversal and may lose its catalytic activity and, e.g., evolve oxygen instead of ozone. In addition, severe deterioration of catalyst active species may occur, such that the electrode ultimately leads to cell failure. In addition, high current density is required to achieve high SEP values or overpotential required for ozone generation, which in turn may lead to low current efficiency for ozone generation. This is therefore an issue related to energy consumption and durability.

Preferably, the present electrode maintains, or at least substantially maintains its initial high overpotential (e.g., does not experience a change of more than 15%, such as experiencing no change or a change of no more than 10%) throughout at least five cycles of current reversal, at least 10 cycles of current reversal, at least 100 cycles of current reversal, or even through at least 1,000 cycles of current reversal.

By comparison, certain other prior art coated electrodes are intolerant to current reversal and lose one or multiple layers within a few current reversal cycles and the overpotential decreases eventually, in some cases leading to $O_2$ evolution instead of $O_3$ evolution. Preferably, the present coated electrode does not lose multiple layers (e.g., it preferably retains all its layers) through any one or more numbers of current reversal cycles noted in the preceding paragraph (i.e., at least five, at least 10, at least 100, or even at least 1,000). Additionally or alternatively, the present coated electrode preferably maintains, or at least substantially maintains, its initial high overpotential through any one or more such numbers of current reversal cycles, and thus may continue to evolve $O_3$ during the process. In some cases, the present layered electrode composition can endure several thousand (e.g., at least 3,000, at least 5,000, or even at least 7,000) current reversal cycles.

In some embodiments, the invention provides a method of manufacturing an electrode 10. The method involves depositing a coating 200 comprising a plurality of layers on a substrate 100. The substrate 100 and coating 200 used for this method can be the same substrate and coating described above.

The basic method of manufacturing the electrode 10 will now be described. Preferably, the surface of the substrate 100 is degreased and cleaned before being etched or sandblasted to create a desired surface roughness. The substrate 100 is then coated with a solution, as described in greater detail below. The coated substrate 100 is dried prior to heating in an oxygen-containing atmosphere to form oxides. The solution coating, drying, and thermal processing steps are repeated for each successive layer in order to form the multi-layered coating 200. The total number of sublayers formed as the different layers of the coating depends on the intended application. The preparation of the electrode 10 for a particular application or process can be controlled and monitored by measuring the electrode potential.

In the present method, depositing the coating 200 comprises depositing a base layer 210 on (optionally directly on) the substrate 100. The base layer 210 comprises an oxide of a valve metal. As noted above, the base layer 210 preferably is devoid of any platinum group metal. The base layer 210 is deposited by: (a) applying one or more coats of a base solution on the substrate 100; and (b) drying and thermally treating each coat of the base solution in an atmosphere containing oxygen. The base solution comprises a salt of a valve metal, such as titanium or tantalum (e.g., $TiCl_4$ or $TaCl_5$).

In another step of the method, depositing the coating 200 comprises depositing the lower layer 220 on (optionally directly on) the base layer 210. The lower layer 220 comprises an oxide of a platinum group metal and/or an oxide of a precious metal. As noted above, the lower layer 220 preferably is devoid of any valve metal. The lower layer 220 is deposited by: (a) applying one or more coats of a lower solution on the substrate 100; and (b) drying and thermally treating each coat of the lower solution in an atmosphere containing oxygen. The lower solution comprises a salt of a platinum group metal, such as iridium chloride (i.e., $IrCl_3$), and/or a salt of a precious metal.

As another step of the method, depositing the coating 200 comprises depositing the mixed oxide primary layer 230 on the lower layer 220. The mixed oxide primary layer 230 is deposited by: (a) applying one or more coats of a primary solution on the substrate 100; and (b) drying and thermally treating each coat of the primary solution in an atmosphere containing oxygen. The primary solution comprises both (i) a salt of a platinum group metal and/or a salt of a precious metal, and (ii) a salt of a valve metal and/or a salt of a group 15 metal.

In some embodiments, depositing the coating 200 comprises depositing at least five layers, including the base layer 210, the lower layer 220, and the mixed oxide primary layer 230. In embodiments of this nature, at least three of the five layers have different compositions from one another. Preferably, the coating deposition is conducted such that each of the noted five layers is contiguous to one or two layers of different composition.

In certain embodiments, depositing the coating 200 further comprises depositing an intermediate layer 240 on (optionally directly on) the mixed oxide primary layer 230. When provided, the intermediate layer 240 comprises an oxide of a platinum group metal and/or an oxide of a precious metal. As noted above, the intermediate layer 240 preferably is devoid of any valve metal. The intermediate layer 240 is deposited by: (a) applying one or more coats of an intermediate solution on the substrate; and (b) drying and thermally treating each coat of the intermediate solution in an atmosphere containing oxygen. The intermediate solution comprises a salt of a platinum group metal and/or a salt of a precious metal.

In preferred embodiments, depositing the coating further involves depositing a mixed oxide upper layer 250 on (optionally directly on) the intermediate layer 240. The mixed oxide upper layer 250 is deposited by: (a) applying one or more coats of an upper solution on the substrate; and (b) drying and thermally treating each coat of the upper solution in an atmosphere containing oxygen. The upper solution comprises both (i) a salt of a platinum group metal and/or a salt of a precious metal, and (ii) a salt of a valve metal and/or a salt of a group 15 metal. In some cases, the coating deposition results in the coating 200 having an outermost (e.g., exposed) face that is defined by the mixed oxide upper layer 250.

Optionally, depositing the coating 200 further comprises depositing a barrier layer 260 directly on the substrate 100, i.e., such that the barrier layer is in contact with the substrate. In some cases, the optional barrier layer 260 is located directly beneath (i.e., so as to contact) the base layer 210. The barrier layer 260 is deposited by: (a) applying one or more coats of a barrier solution on the substrate; and (b) drying and thermally treating each coat of the barrier solution in an atmosphere containing oxygen. The barrier solution comprises a salt of a valve metal. Preferably, the barrier layer deposition is conducted such that it consists of (or consists essentially of) one or more valve metal oxides, such as tantalum oxide.

In certain non-limiting embodiments, the coating deposition is conducted such that the base layer 210 comprises an oxide of tantalum; the lower layer 220 comprises an oxide of platinum; the mixed oxide primary layer 230 comprises both an oxide of platinum and an oxide of tantalum; the intermediate layer 240 comprises an oxide of platinum; and the mixed oxide upper layer comprises both an oxide of platinum and an oxide of tantalum. If desired, each of these layers can consist, or consist essentially of, the materials noted in this paragraph.

In manufacturing the electrode 10 of the present invention, when the substrate 10 is provided in plate form, either one or both of its faces can have the coating 200 deposited thereon. When such an electrode 10 is disposed in an electrochemical cell to face a counter electrode, i.e., in a monopolar configuration, only one face of the substrate 100 will typically have the coating 200. In a bipolar configuration, both faces of the substrate 100 will typically have the coating 200.

Before depositing the coating 200, the surface of the substrate 100 may be polished to remove any dirt, grease or oily deposits and any oxide films that may be present. The polishing process may involve using sandpaper or blasting the surface with sand or grit particles. The polished surface may then be rinsed with an organic solvent, such as acetone, to remove any residual organic contaminants. It is then preferably etched in concentrated hydrochloric acid (20%) at 85-90° C. Other etching solutions, such as oxalic acid, sulfuric acid or hydrofluoric acid, may also be used. The etching process can be continued until a predetermined surface condition (e.g., topography) is obtained. While etching is preferred, it may not be done in some cases.

When etching is done, the etched surface of the substrate 100 is subsequently coated with a thin layer of coating solution dissolved in either water or an organic solvent (e.g., isopropanol or n-butanol). Next, the etched substrate 100 is sequentially coated with multiple, thin coats of the different coating solutions. Each coat is dried and then thermally cured at a temperature between 480° C. and 510° C. for approximately 10 minutes, before an additional coat is applied.

A small amount of concentrated hydrochloric acid can optionally be added to the coating solution, whether the solution is water or alcohol based. It is advantageous to coat the substrate 100 by applying a thin layer of diluted coating solution. This can provide uniform distribution of the metal salts in the coating 200, thereby yielding uniform distribution of the oxides in the layer after thermal treatment.

The coating solutions described herein may be applied to the substrate 100 by any method used to apply liquids to a solid surface. Such methods include application with a brush or roller, spray coating, dip spin and dip drain techniques, spin coating and spray coating, such as electrostatic spray coating. Moreover, combinations of these coating methods can be used, e.g., dip drain with spray application.

Once coated, the substrate 100 is allowed to dry at room temperature for several minutes and is then heated, in an atmosphere containing oxygen, to a temperature between 150° C. and 250° C., preferably between 210° C. and 230° C., for approximately ten minutes. A further thermal treatment is then carried out, heating the coated substrate 100, again in an atmosphere containing oxygen, to a temperature between 450° C. and 550° C., preferably between 480° C. and 510° C., for approximately another ten minutes to completely decompose the metal salts. It is preferable to avoid higher temperatures for the thermal treatment to prevent the possible crystallization of the valve metal oxide, which can result in the formation of cracks and pores in the coating 200. Thus, in any embodiment of the present disclosure, the electrode coating can optionally result from a manufacturing process that is devoid of any heat treatment involving temperatures of greater than 550° C. The coated substrate 200 is allowed to cool to room temperature before applying any additional coats of coating solution to the substrate 100, and repeating the drying and heating steps described above for each additional coat.

The foregoing approach allows control of both the thickness of the coating 200 and the loading (i.e., the specific amount of metal per unit area) in the coating 200. The loading of the metals oxides, usually expressed in terms of grams per square meter of geometric area, can be readily controlled by the concentration of the salt in the coating solutions and the number of coats applied to the substrate 100. A plurality of thin coats is desirable to avoid forming powdery deposits. Multiple thin coats produce a more compact, less cracked and more durable electrode 10. The number of coats for each layer may be dictated by the desired loading.

Some embodiments of the invention provide a method of using an electrochemical cell 300 to perform an electrochemical process. In the present embodiments, the method involves operating the electrochemical cell 300 so as to reverse a polarity of electrical current flow through an electrode 10 immersed in electrolyte within the cell. In these embodiments, the electrode 10 has a coating 200 that is durable to reversing polarity. This is in contrast to many conventional electrodes, which cannot tolerate current reversal. In some of the present embodiments, the electrochemical process generates a strong oxidant selected from the group consisting of ozone, peracetic acid, and persulfuric acid. In certain cases, the electrochemical process generates ozone.

The basic construction of the electrochemical cell 300 can be like that of various conventional electrochemical cells. As shown in FIG. 8, the electrochemical cell 300 comprises a housing 310, an electrolyte 320 contained in the housing 310, and an electrode 10 immersed in the electrolyte 320.

Preferably, the electrolyte 320 is a liquid electrolyte, such as an aqueous electrolyte. In some cases, the electrolyte 320 comprises hard water (e.g., hard cations). Hard water is generally defined as water having high mineral content, specifically a high content of calcium and magnesium carbonates. Water hardness is caused not only by compounds of calcium and magnesium, but also by a variety of other metals. For example, hard water can include elevated levels of iron, aluminum, and/or manganese. Water hardness is affected by the precise mixture of minerals dissolved in a given water supply, as well as other factors, including the temperature and pH of the water.

The United States Geological Survey uses the following guidelines for classification of water hardness: 0 to 60 mg/L of calcium carbonate in the water is classified as soft; 61 to 120 mg/L of calcium carbonate in the water is classified as moderately hard; 121 to 180 mg/L of calcium carbonate in the water is classified as hard; and more than 180 mg/L of calcium carbonate in the water is classified as very hard. Using these guidelines, seawater is considered to be very hard due to the presence of various dissolved salts, whereas freshwater can range from soft to very hard, depending on a variety of factors. The present disclosure adopts these guidelines for classifying water hardness. Thus, in some embodiments of the present method, the electrolyte comprises water that is moderately hard, hard, or very hard pursuant to the noted standard. In certain cases, the electrolyte comprises water that is either hard or very hard pursuant to the noted standard.

In certain embodiments, the present method involves operating the electrode 10 while it is immersed in an electrolyte comprising water that is at least hard, or at least moderately hard, pursuant to the noted standard (and thus comprises hard cations). In such cases, reversing the polarity of electrical current flow through the electrode 10 blasts mineral scale buildup from the electrode 10. Thus, in certain embodiments, the method involves reversing the polarity of electric current flow through the electrode and thereby removing scale buildup from the electrode.

The electrode 10 used in the present method generally comprises a substrate 100 and a coating 200 on the substrate 100. The substrate 100 can be the same as the substrate described elsewhere in the present disclosure. In FIG. 8, the electrochemical cell 300 comprises two electrodes, e.g., an anode and a cathode. This arrangement allows electricity to flow from one electrode 10 to the other. Optionally, a membrane 330 can be positioned between the two electrodes 10 to partition an inside of the housing 310 into anode and cathode sides.

As shown in FIG. 9, the coating 200 used in the present method comprises the following plurality of layers in sequence moving outwardly from the substrate 100: a mixed oxide primary layer 230; an intermediate layer 240; and a mixed oxide upper layer 250. The mixed oxide primary layer 230 comprises both: (i) an oxide of a platinum group metal and/or an oxide of a precious metal, and (ii) an oxide of a valve metal and/or an oxide of a group 15 metal. The intermediate layer 240 comprises an oxide of a platinum group metal and/or an oxide of a precious metal. The intermediate layer 240 preferably is devoid of any valve metal oxide. The mixed oxide upper layer 250 comprises both: (i) an oxide of a platinum group metal and/or an oxide of a precious metal, and (ii) an oxide of a valve metal and/or an oxide of a group 15 metal. In some cases, the coating 200 has an outermost (e.g., exposed) face that is defined by the mixed oxide upper layer 250 (see FIG. 9).

The mixed oxide primary layer 230 (i.e., the, or each, sublayer thereof) can optionally have the same, or substantially the same, composition as the mixed oxide upper layer 250 (e.g., as one or more sublayers thereof). In some cases, all the sublayers of the mixed oxide primary layer and the mixed oxide upper layer have the same composition.

The mixed oxide primary layer 230 used in the present method can have the same composition as the mixed oxide primary layer 230 described above for other embodiments of the present disclosure. Likewise, the intermediate layer 240 used in the present method can have the same composition as the intermediate layer 240 described above for other embodiments. Furthermore, the mixed oxide upper layer 250 used in the present method can have the same composition as the mixed oxide upper layer 250 described above for other embodiments.

Optionally, the coating 200 used in the present method can include one or more additional layers. For example, it can further comprise a lower layer 220 that is located closer to the substrate 100 than is the mixed oxide primary layer 230. When provided, the lower layer 220 comprises an oxide of a platinum group metal and/or an oxide of a precious metal. The optional lower layer 220 preferably is devoid of any valve metal oxide. The lower layer 220 used in the present method can have the same composition as the lower layer 220 described above for other embodiments.

When provided, the lower layer 220 (i.e., the, or each, sublayer thereof) can optionally have the same, or substantially the same, composition as the intermediate layer 240. In some cases, all the sublayers of the lower layer and the intermediate layer have the same composition.

In some cases, the coating 200 used in the present method includes five layers, including the mixed oxide primary layer 230, the intermediate layer 240, and the mixed oxide upper layer 250. In embodiments of this nature, at least three of the five layers preferably have different compositions from one another. In some embodiments, each of the noted five layers is contiguous to one or two layers of different composition.

Optionally, the coating used in the present method can further comprise a base layer 210. When provided, the base layer 210 is located closer to the substrate 100 than is the lower layer 220. The base layer 210 comprises an oxide of a valve metal. In addition, the base layer 210 preferably is devoid of any platinum group metal oxide. The base layer 210 used in the present method can have the same composition as the base layer 210 described above for other embodiments.

In some cases, the coating used in the present method further includes a barrier layer 260. When provided, the barrier layer 260 is in contact with the substrate 100. The optional barrier layer 260 comprises one or more valve metal oxides, and preferably is devoid of any platinum group metal oxide. The barrier layer 260 used in the present method can have the same composition as the barrier layer 260 described above for other embodiments.

Further, in certain embodiments the invention provides or involves an electrochemical cell 300 containing an electrolyte 320 and equipped with an electrode 10 of the nature described herein.

In some non-limiting examples, anodes according to the invention can be made by a method of manufacturing that preferably includes cleaning a titanium substrate. In the present examples, the titanium substrate can be grit blasted to enhance the surface roughness and preferably by etching in acid bath to remove undesired surface oxides and other surface components. Subsequently, solutions of the desired metal compounds and compositions can be applied to the substrate, layer wise. In the present examples, current reversal stable mixed metal oxide electrodes can be prepared according to the following procedure. Five different coating solutions can all be used to make various preferred versions of the coating, as described below.

| Layer No. | Number of coats per layer | Ta $(g/m^2)$/ coat | Pt $(g/m^2)$/ coat | Bi $(g/m^2)$/ coat |
|---|---|---|---|---|
| 1 | 4-6 | 1 | — | — |
| 2 | 5 | — | 1-5 | — |
| 3 | 1 | 1-4 | 0.01-0.25 | 0.01-0.05 |
| 4 | 1-5 | — | 1-5 | — |
| 5 | 15-35 | 1-4 | 0.01-0.35 | 0.01-0.1 |

Platinum salt or precursor: Hexachloro platinic acid or any Pt salt that dissolves in butanol and acid solution
Tantalum salt or precursor: Tantalum pentachloride
Bismuth salt or precursor: Bismuth chloride
Solvent used to prepare layer 1: Butanol (100%)
Solvent used to prepare layers 3 and layer 5: ethanol:acid (95:5)
Solvent used to prepare layer 2 and 4: Butanol:acid (38:1)
Baking temperatures for layer 1: 455-475° C.
Baking temperature for layer 2 and layer 4: 450-500° C.
Baking temperature for layer 3 and layer 5: 525-575° C.

The coating of the foregoing non-limiting examples can be applied in various ways, and to various forms of the valve metal based anodes, such as solid rolled massive titanium plates, perforated plates, slitted, reticulated, titanium plates, titanium mesh and rolled titanium mesh, woven titanium wire, or screen or similar titanium plates. The coating can be applied on valve metals by different methods. For example, it can be painted on, dipped, sprayed, screen printed, ink-jet printed or curtain coatings baked on a titanium anode base. Other methods of application, including electrophoretic deposition or electrodeposition, may be used.

While some preferred embodiments of the invention have been described, it should be understood that various changes, adaptations and modifications may be made therein without departing from the spirit of the invention and the scope of the appended claims. It is intended that all such modifications and alterations be included insofar as they come within the scope of the invention as claimed or the equivalents thereof.

What is claimed is:
1. An electrode comprising:
a substrate; and
a coating on the substrate, the coating comprising a plurality of layers, the plurality of layers comprising the following in sequence moving outwardly from the substrate:
  a. a base layer comprising an oxide of a valve metal, the base layer being devoid of any platinum group metal oxide;
  b. a lower layer comprising an oxide of a platinum group metal and/or an oxide of a precious metal, the lower layers being devoid of any valve metal oxide;
  c. a mixed oxide primary layer comprising both: (i) an oxide of a platinum group metal and/or an oxide of a precious metal, and (ii) an oxide of a valve metal and/or an oxide of a group 15 metal; and
  d. an intermediate layer comprising an oxide of a platinum group metal and/or an oxide of a precious metal, the intermediate layer being devoid of any valve metal oxide.

2. The electrode of claim 1, wherein the coating is devoid of any mixed metal oxide layer between the base layer and the lower layer.

3. The electrode of claim 1, wherein the coating comprises five layers, including the base layer, the lower layer, and the mixed oxide primary layer, at least three of the five layers having different compositions from one another.

4. The electrode of claim 3, wherein each of the five layers is contiguous to one or two layers of different composition.

5. The electrode of claim 1, wherein the plurality of layers further comprises:
   a. a mixed oxide upper layer comprising both: (i) an oxide of a platinum group metal and/or an oxide of a precious metal, and (ii) an oxide of a valve metal and/or an oxide of a group 15 metal, the mixed oxide upper layer being located further from the substrate than is the intermediate layer.

6. The electrode of claim 5, wherein the coating has an exposed face that is defined by the mixed oxide upper layer.

7. The electrode of claim 1, wherein the plurality of layers further includes a barrier layer comprising one or more valve metal oxides, the barrier layer being in contact with the substrate and beneath the base layer.

8. The electrode of claim 7, wherein the barrier layer consists of one or more valve metal oxides.

9. The electrode of claim 5, wherein the base layer comprises an oxide of tantalum.

10. The electrode of claim 9, wherein the lower layer comprises an oxide of platinum.

11. The electrode of claim 10, wherein the mixed oxide primary layer comprises both an oxide of platinum and an oxide of tantalum.

12. The electrode of claim 11, wherein the intermediate layer comprises an oxide of platinum.

13. The electrode of claim 12, wherein the mixed oxide upper layer comprises both an oxide of platinum and an oxide of tantalum.

14. The electrode of claim 1, wherein the substrate comprises a valve metal.

15. The electrode of claim 14, wherein the substrate is a titanium plate or a titanium mesh.

16. An electrode comprising:
    a substrate; and
    a coating on the substrate, the coating comprising
       a plurality of layers,
          the plurality of layers comprising the following in sequence moving outwardly from the substrate:
          a. a base layer comprising an oxide of a valve metal, the base layer being devoid of any platinum group metal oxide;
          b. a lower layer comprising an oxide of a platinum group metal and/or an oxide of a precious metal, the lower layers being devoid of any valve metal oxide; and
          c. a mixed oxide primary layer comprising both: (i) an oxide of a platinum group metal and/or an oxide of a precious metal, and (ii) an oxide of a valve metal and/or an oxide of a group 15 metal,
    wherein two of the plurality of layers, including the lower layer and an additional layer, (i) each comprise an oxide of a platinum group metal and/or an oxide of a precious metal, (ii) are each devoid of any valve metal oxide, and (iii) are separated by the mixed oxide primary layer.

17. An electrode comprising:
    a substrate; and
    a coating on the substrate, the coating comprising a plurality of layers, the plurality of layers comprising the following in sequence moving outwardly from the substrate:
    a. a base layer comprising an oxide of a valve metal, the base layer being devoid of any platinum group metal oxide;
    b. a lower layer comprising an oxide of a platinum group metal and/or an oxide of a precious metal, the lower layer being devoid of any valve metal oxide;
    c. a mixed oxide primary layer comprising both: (i) an oxide of a platinum group metal and/or an oxide of a precious metal, and (ii) an oxide of a valve metal and/or an oxide of a group 15 metal;
    d. an intermediate layer comprising an oxide of a platinum group metal and/or an oxide of a precious metal, the intermediate layer being devoid of any valve metal oxide; and
    e. a mixed oxide upper layer comprising both: (i) an oxide of a platinum group metal and/or an oxide of a precious metal, and (ii) an oxide of a valve metal and/or an oxide of a group 15 metal.

* * * * *